US009154470B2

(12) United States Patent
Lebron et al.

(10) Patent No.: US 9,154,470 B2
(45) Date of Patent: Oct. 6, 2015

(54) SYSTEM AND METHOD FOR PROCESSING TRANSACTIONS

(71) Applicant: Canon U.S.A., Inc., Melville, NY (US)

(72) Inventors: Michael Louis Lebron, Dix Hills, NY (US); Tatsuya Kameda, Shinagawa-ku (JP)

(73) Assignee: Canon U.S.A., Inc., Melville, NY (US)

( * ) Notice: Subject to any disclaimer, the term of this patent is extended or adjusted under 35 U.S.C. 154(b) by 57 days.

(21) Appl. No.: 13/902,588

(22) Filed: May 24, 2013

(65) Prior Publication Data
US 2013/0318348 A1 Nov. 28, 2013

Related U.S. Application Data

(60) Provisional application No. 61/652,107, filed on May 25, 2012.

(51) Int. Cl.
*H04L 29/06* (2006.01)
*H04L 29/08* (2006.01)

(52) U.S. Cl.
CPC ........ *H04L 63/0428* (2013.01); *H04L 63/0846* (2013.01); *H04L 63/168* (2013.01); *H04L 67/02* (2013.01)

(58) Field of Classification Search
CPC . H04L 63/0428; H04L 63/0846; H04L 67/02; H04L 63/168
USPC ........... 713/168; 705/64, 65, 66, 67; 709/229; 726/26–33
See application file for complete search history.

(56) References Cited

U.S. PATENT DOCUMENTS

| 5,883,810 | A | 3/1999 | Franklin et al. | |
| 7,225,156 | B2 | 5/2007 | Fisher et al. | |
| 7,343,351 | B1 * | 3/2008 | Bishop et al. | 705/67 |
| 7,945,774 | B2 | 5/2011 | Ganesan | |
| 7,979,791 | B2 | 7/2011 | Yang et al. | |
| 8,090,763 | B2 | 1/2012 | Li | |
| 8,108,266 | B2 | 1/2012 | Drudis et al. | |
| 8,290,876 | B1 * | 10/2012 | Powell | 705/64 |
| 8,396,808 | B2 | 3/2013 | Greenspan | |
| 2004/0073688 | A1 | 4/2004 | Sampson | |
| 2007/0143209 | A1 | 6/2007 | German et al. | |
| 2007/0226152 | A1 | 9/2007 | Jones | |

(Continued)

OTHER PUBLICATIONS

Authorize.Net, "Direct Post Method (DPM)," Developer Guide, Mar. 2012.

(Continued)

*Primary Examiner* — Harunur Rashid
(74) *Attorney, Agent, or Firm* — Canon U.S.A., Inc. IP Division

(57) ABSTRACT

Embodiments of the invention include methods, systems, and computer-readable media for processing transactions involving sensitive information, such as a credit card number. Embodiments include a first server authenticating a second server based on a security token and determining whether the security token is expired. Based on the results, the first server may request a transaction token associated with sensitive information. The first server may encrypt the transaction token using a public key of the second server. The first server may send the encrypted transaction token as a parameter to a URL, wherein the URL is configured to cause a browser on a client to send, to the second server, a request for the page and the encrypted transaction token.

20 Claims, 8 Drawing Sheets

(56) References Cited

U.S. PATENT DOCUMENTS

| | | | |
|---|---|---|---|
| 2008/0011823 A1* | 1/2008 | Patel et al. | 235/375 |
| 2010/0030697 A1 | 2/2010 | Goodrich et al. | |
| 2010/0094755 A1* | 4/2010 | Kloster | 705/44 |
| 2011/0029416 A1 | 2/2011 | Greenspan | |
| 2011/0195690 A1 | 8/2011 | Brown et al. | |
| 2012/0005038 A1 | 1/2012 | Soman | |
| 2012/0066081 A1* | 3/2012 | Shader et al. | 705/18 |
| 2013/0232079 A1* | 9/2013 | Lindelsee et al. | 705/44 |
| 2013/0282582 A1* | 10/2013 | Pereira et al. | 705/44 |

OTHER PUBLICATIONS

Paypal, "Gateway Developer Guide and Reference," Jun. 2012.
First Data, "How Multi-Pay Tokens Can Reduce Security Risks and the PCI Compliance Burden for eCommerce Merchants," 2012.
Banerjee et al., "A Prototype Design for DRM based Credit Card Transaction in E-Commerce," ACM Ubiquity, May 2008, vol. 9, Issue 18, Department of Computer Science, University of Burdwan, India.
Exhibits A, B & C, incorporated by reference in U.S. Patent Application Publication No. 2012/0005038; filed as Appendices to the Specification, Jul. 1, 2011.

* cited by examiner

Authorization Result Page

SYSTEM AND METHOD FOR PROCESSING TRANSACTIONS

CROSS-REFERENCE TO RELATED APPLICATIONS

This application claims the benefit of U.S. Provisional Application No. 61/652,107, filed May 25, 2012, which is hereby incorporated by reference herein in its entirety.

TECHNICAL FIELD

The present invention relates generally to processing transactions, and more particularly to a system and method for processing transactions in a network environment.

BACKGROUND

When a user and an entity are carrying out a transaction, such as with electronic commerce, the entity often processes and/or stores sensitive information. For example, a merchant may collect, process, and store a credit card number when a user accesses a commerce application, such as a web site, to purchase a good or service sold by the merchant. Collecting, processing or storing such data may subject the entity to costly security audits and regulations. Moreover, an entity may utilize multiple unique deployments of commerce applications for electronic commerce, thereby introducing multiple systems that collect, process, or store sensitive information, such as credit card or debit card numbers for payment processing. Having multiple systems that collect, process or store sensitive information may subject the entity to additional regulatory burdens which may be repetitive across the multiple systems.

BRIEF SUMMARY OF THE INVENTION

Methods, systems, and computer-readable media for processing transactions are disclosed.

Some embodiments of the invention include receiving, at a first server from a browser on a client, a security token and sensitive information, the security token having been generated by a second server. At the first server, operations are performed on the security token for authenticating the second server and determining whether the security token is expired. In response to authenticating the second server and determining that the security token is not expired, the first server sends to a service provider the sensitive information and a request for a transaction token. The first server receives the transaction token from the service provider, the transaction token comprising a string of characters associated with the sensitive information. The first server may use a public key of the second server to encrypt the transaction token. The first server sends to the client a uniform resource locator (URL) specifying a page hosted by the second server, the URL including the encrypted transaction token as a parameter, wherein the URL is configured to cause the browser on the client to send, to the second server, a request for the page and the encrypted transaction token.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A-3D illustrate example web pages.

DESCRIPTION OF THE EMBODIMENTS

Figure 1:
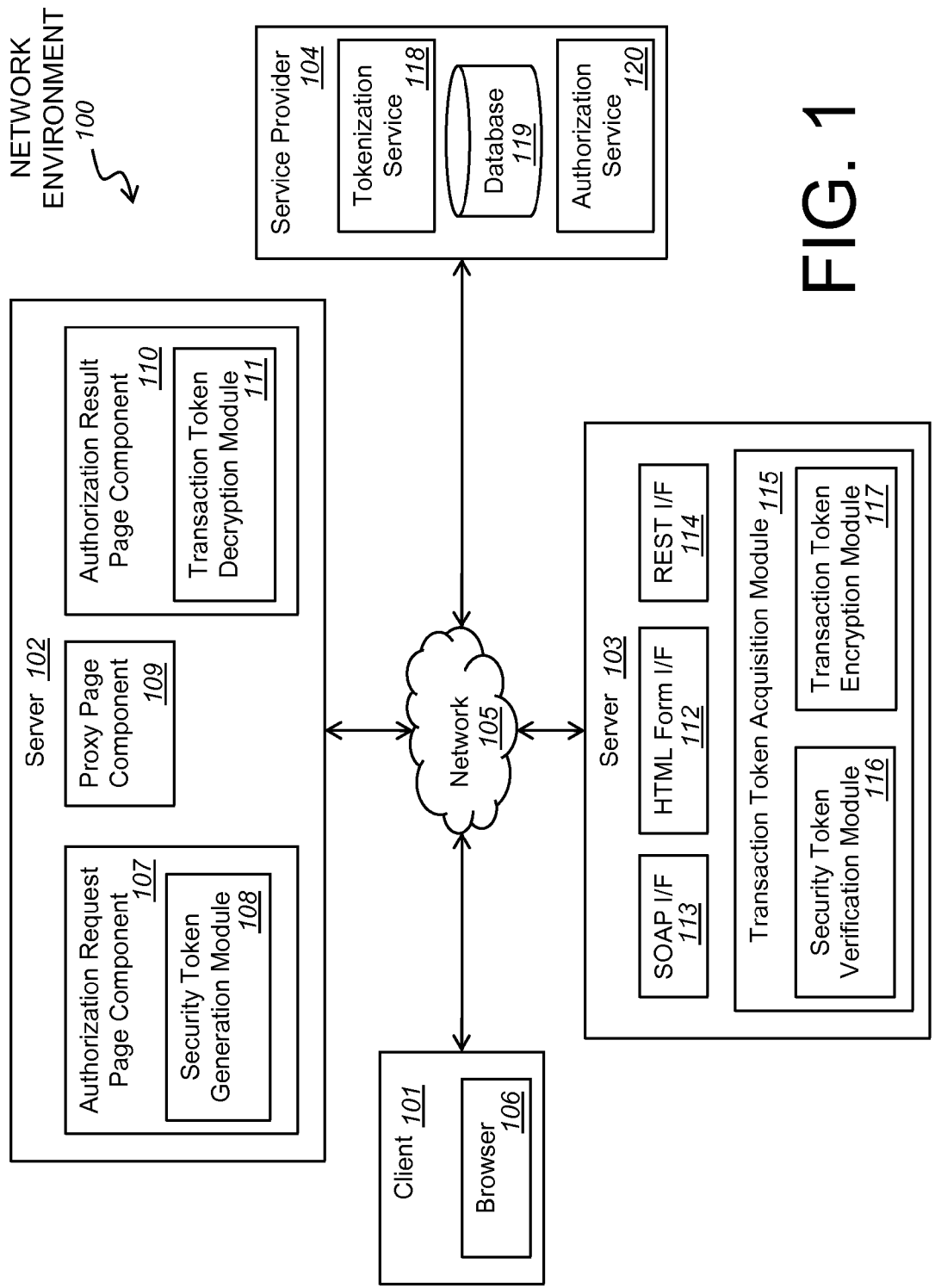
FIG. 1 illustrates an example network environment.

Embodiments of the present invention are described with reference to the drawings. FIG. 1 illustrates an example network environment 100. A client 101, a server 102, a server 103, and a service provider 104 are connected to a network 105. A browser 106 executing on the client 101 may be used to access a resource, such as an application, web page, or other resource, of the server 102. For example, a user at the client 101 may utilize the browser 106 to navigate to resources of the server 102 for the purpose of carrying out a transaction between the user and a merchant associated with the server 102. To complete the transaction, one or more resources of the server 103 and the service provider 104 may be utilized.

The client 101 includes hardware, software, or both for providing the functionality of the client 101. In some embodiments, the client 101 is unitary. In some embodiments, the client 101 is distributed. The client 101 may span multiple locations. The client 101 may span multiple machines. The browser 106 may execute on the client 101.

The browser 106 may be a web browser such as MICROSOFT INTERNET EXPLORER or MOZILLA FIREFOX, and may be used to access a resource, such as a web page. The browser 106 may enable a user to display and interact with text, images, form elements, or other information typically located on a web page served by a web server on the World Wide Web or a local area network. The browser 106 may support various types of downloadable, executable, software modules, such as applets or plug-ins. For example, the browser 106 may incorporate a virtual machine configured to execute a program, such as a JAVA applet, embedded in a web page accessed by the browser 106. The client 101 may have various add-ons, plug-ins, or other extensions for use in or with the browser 106. In some embodiments, the browser 106 executes a web page having executable code, such as JAVASCRIPT embedded in the web page, which generates an inline frame (iframe).

The server 102 includes hardware, software, or both for providing the functionality of the server 102. In some embodiments, the server 102 is unitary. In some embodiments, the server 102 is distributed. The server 102 may span multiple locations. The server 102 may span multiple machines. By way of example, the server 102 may be a web server or an application server, providing access to one or more resources. In some embodiments, the server 102 hosts a web site.

The server 102 may receive hypertext transfer protocol (HTTP) requests and provide HTTP responses. For example, the server 102 may serve content in the form of a web page in response to a request from a web browser. The web page may be static or dynamic and may comprise Hyper Text Markup Language (HTML) files, or other suitable files, executable code, such as JAVASCRIPT, form elements, images, or other content. One or more elements of the web page content may be stored at the server 102. For example, the server 102 has an authorization request page component 107, a proxy page component 109, and an authorization result page component 110, which include various web page elements and executable instructions for providing web pages described herein. Additionally, the server 102 has a security token generation module 108 and a security token decryption module 111 for performing operations on data as described herein with reference to FIG. 2.

The server 102 may host a web page that requests sensitive information. For example, a merchant may use the server 102 to host a web site for selling goods or services and sensitive information, such as a credit card number or debit card number, may be required to complete a transaction. Other examples of sensitive information that an entity could request include identification information, such as a social security number, account information, a credential, health information, or financial information. The server 102 may use the authorization request page component 107 to request the sensitive information required to complete a transaction or grant access to some resource. The server 103 and the service provider 104 may also perform operations with respect to the sensitive information.

The server 103 includes hardware, software, or both for providing the functionality of the server 103. In some embodiments, the server 103 is unitary. In some embodiments, the server 103 is distributed. The server 103 may span multiple locations. The server 103 may span multiple machines. By way of example, the server 103 may be an application server, providing access to one or more resources.

The server 103 may include one or more interfaces for receiving and transmitting information. For example, the server 103 may include an HTML form interface 112 able to receive information from and send information to the browser 106 running on the client 101. The server 103 may include a Simple Object Access Protocol (SOAP) interface 113 and a representation state transfer (REST) interface 114, or other interface, to support various messaging and data protocols over HTTP.

The server 103 may perform operations with respect to the sensitive information. For example, the server 103 includes a transaction token acquisition module 115 which may receive, via the HTML form interface 112, the sensitive information and perform operations to acquire a transaction token using the sensitive information as described herein with reference to FIG. 2. Additionally, the server 103 has a security token verification module 116 and a transaction token encryption module 117 for performing operations on data as described herein with reference to FIG. 2.

The service provider 104 includes hardware, software, or both for providing the functionality of the service provider 104. In some embodiments, the service provider 104 is unitary. In some embodiments, the service provider 104 is distributed. The service provider 104 may span multiple locations. The service provider 104 may span multiple machines. By way of example, the service provider 104 may be an application server, providing access to one or more resources.

The service provider 104 may provide various resources to facilitate a transaction. For example, the service provider 104 may include a tokenization service 118, a database 119, and an authorization service 120 for performing operations on data as described herein with reference to FIG. 2. In some embodiments, the service provider 104 provides services only for entities pre-registered with the service provider 104. For example, the server 102 and/or the server 103 may be required to register with the service provider 104, by providing identification information such as an application identification number or an Internet Protocol (IP) address, before the service provider 104 provides a service for the server 102 or the server 103.

The network 105 couples one or more servers and one or more clients to each other. The network 105 may be any suitable network. For example, one or more portions of the network 105 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 105 may include one or more networks.

Figure 2:
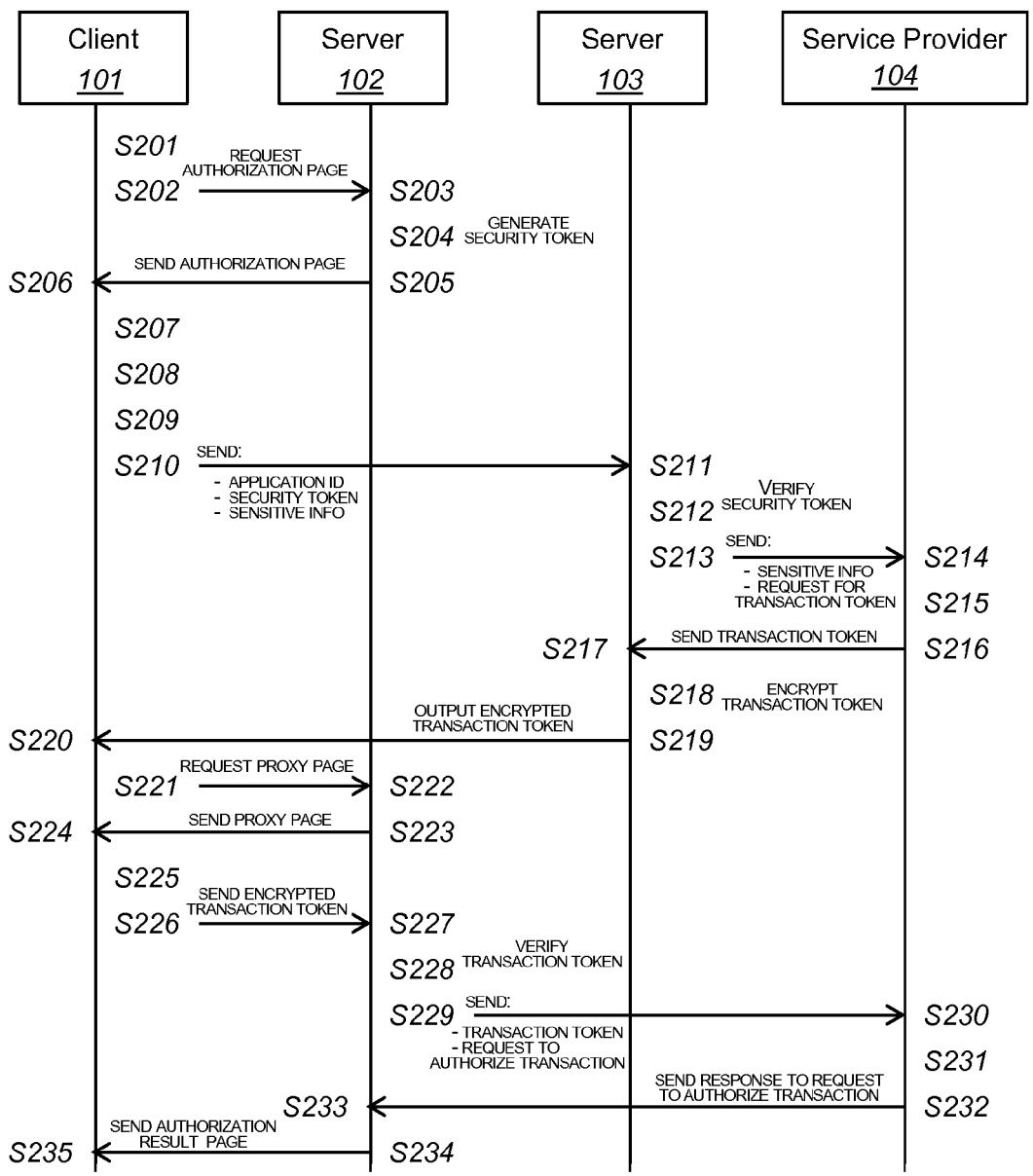
FIG. 2 illustrates an example flow of operations within the example network environment of FIG. 1.

FIG. 2 is described with reference to the example network environment 100 of FIG. 1. FIG. 2 illustrates an example flow of operations within the example network environment 100.

In step S201, the client 101 receives a user input operation via the browser 106. For example, the user may input a uniform resource identifier (URI), or may click a hypertext link within a browser window. The URI or the hypertext link may identify an authorization request page. The authorization request page is a web page for obtaining sensitive information, such as a credit card number, to complete a transaction. By way of example, a merchant may use the server 102 to host a web site for selling goods or services. The web site may be part of a commerce application running on the server 102. A user at the client 101 may provide the user input operation via the browser 106 in order to carry out a transaction between the user and the merchant. To complete the transaction, the user may be required to provide sensitive information, such as a credit card number or debit card number.

In step S202, based on the user input, the browser 106 sends a request to access the web page identified by the URI or the hypertext link. That is, the browser 106 sends to the server 102 a request to access the authorization request page. In step S203, the server 102 receives from the browser 106 on the client 101 the request to access the authorization request page.

In step S204, in response to receiving the request, the authorization request page component 107 is invoked at the server 102. The server 102 utilizes the security token generation module 108 to generate a security token. In some embodiments, the security token comprises data indicating an expiration time of the security token, the data being encrypted and the message being digitally signed. For example, the security token generation module 108 generates data based on a creation time of the security token and a duration that the security token should be valid. The duration of the validity of the security token may vary and may be set by an administrator of the application running on the server 102, for example. Accordingly, the generated data indicates the time that the security token will expire. The generated data, which indicates the expiration time, is then encrypted. The server 102 encrypts the generated data using the server's 103 public key, for example, with a public key encryption algorithm such as RSA. Other encryption techniques based on public key cryptography may be used in some implementations. Once encrypted, the encrypted data can be decrypted only using the server's 103 private key, according to embodiments. After encrypting the generated data, the server 102 signs the message using a digital signature. For example, the digital signature may be a digest of the message, for example, a hash of the message, encoded using the server's 102 private key, which can then be appended to the outgoing message. Later, to verify the digital signature of the message, the server 103 may use the same technique as the server 102, for example, using the same standard hash algorithm, to obtain a digest of the message that the server 103 has received. For example, the server 103 may use the server's 102 public key to decode the digital signature, in order to obtain what should be a matching digest for the received message. Accordingly, by verifying a digital signature in this way, authentication of the server 102 and message integrity can be maintained.

Still referring to step S204, in response to the request received in step S203, the server 102 prepares the authorization request page to send to the client 101. The authorization request page may be a dynamic web page. The generated security token is embedded in the authorization request page. Additionally, application identification information corresponding to an application running on the server 102 may be embedded in the authorization request page. For example, a commerce application running on the server 102 may provide the authorization request page to the client 101 and the application identification information may be an application identification number (application ID) of the commerce application. In step S205, the authorization request page is sent from the server 102 to the client 101.

In step S206, the client 101 receives the authorization request page sent in step S205. The browser 106 interprets and processes the authorization request page. Once the authorization request page is loaded, information is displayed via the browser 106. For example, form elements, such as a submit button and a field for receiving an input, such as sensitive information, may be displayed via the browser 106.

Figure 3A:
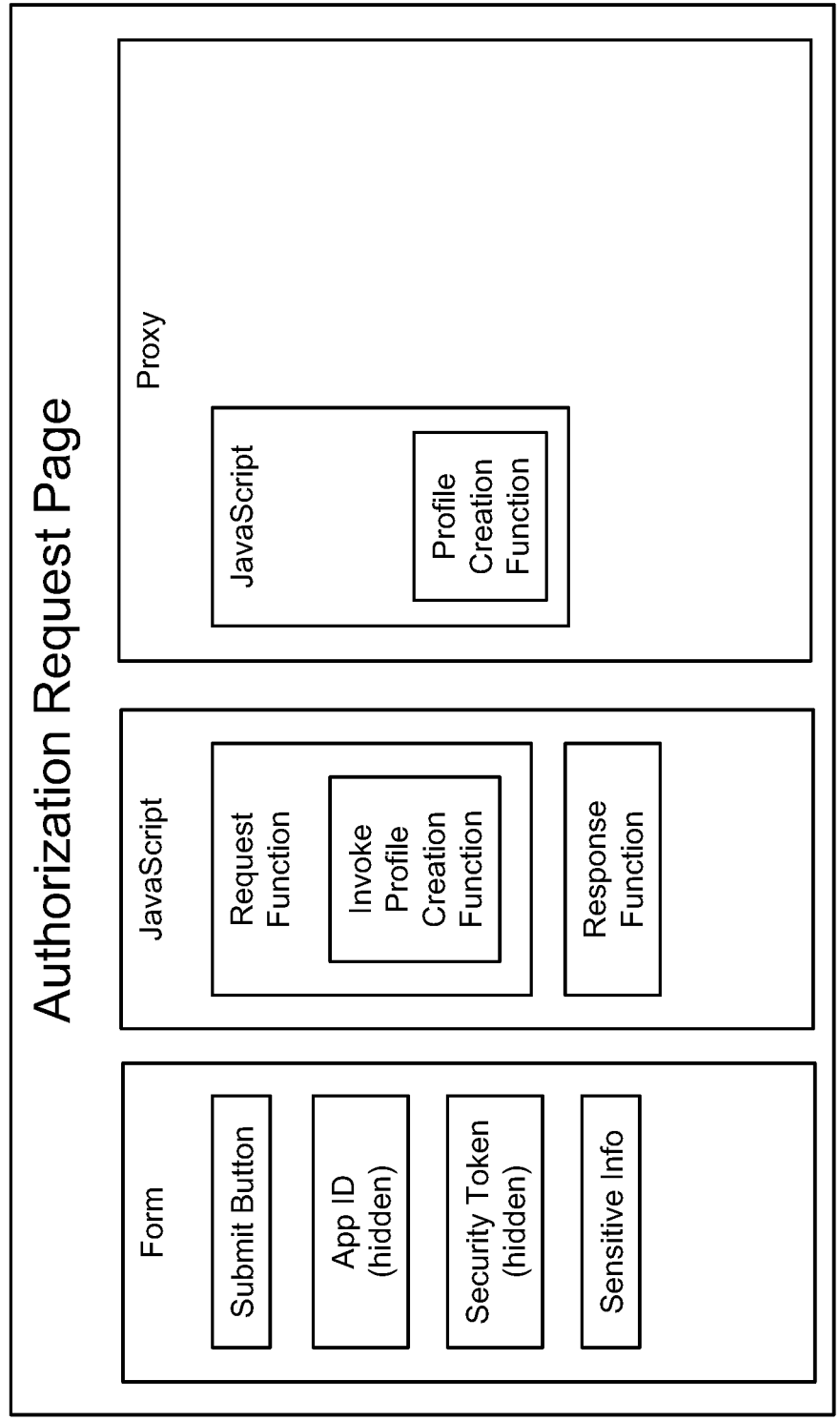

In step S207, the client 101 receives a user input operation via the browser 106 while the authorization request page is displayed. In some embodiments, the authorization request page is the web page illustrated at FIG. 3A. FIG. 3A illustrates the authorization request page including executable code, such as JAVASCRIPT, form elements, and other content. FIG. 3A illustrates the application ID and the security token, which were embedded in the authorization request page in step S204, as hidden inputs among the form data included in the authorization request page. That is, the application ID and the security token are not displayed when the authorization request page is displayed in the browser 106. In step S207, the client 101 receives sensitive information by the user input operation via the browser 106. The sensitive information may be a credit card number for carrying out a transaction between the user and a merchant. The user may provide other information in addition to the sensitive information. Once the sensitive information is provided, the user submits form information and a request by selecting the submit button.

In step S208, the client 101 performs validation processing. For example, the client 101 may perform a validation process on the sensitive information to ensure the sensitive information includes the correct number of digits, the correct type of characters, or other check. If the validation processing is unsuccessful, the user is notified via the browser 106. If the validation processing is successful, the process continues to step S209.

Figure 3B:
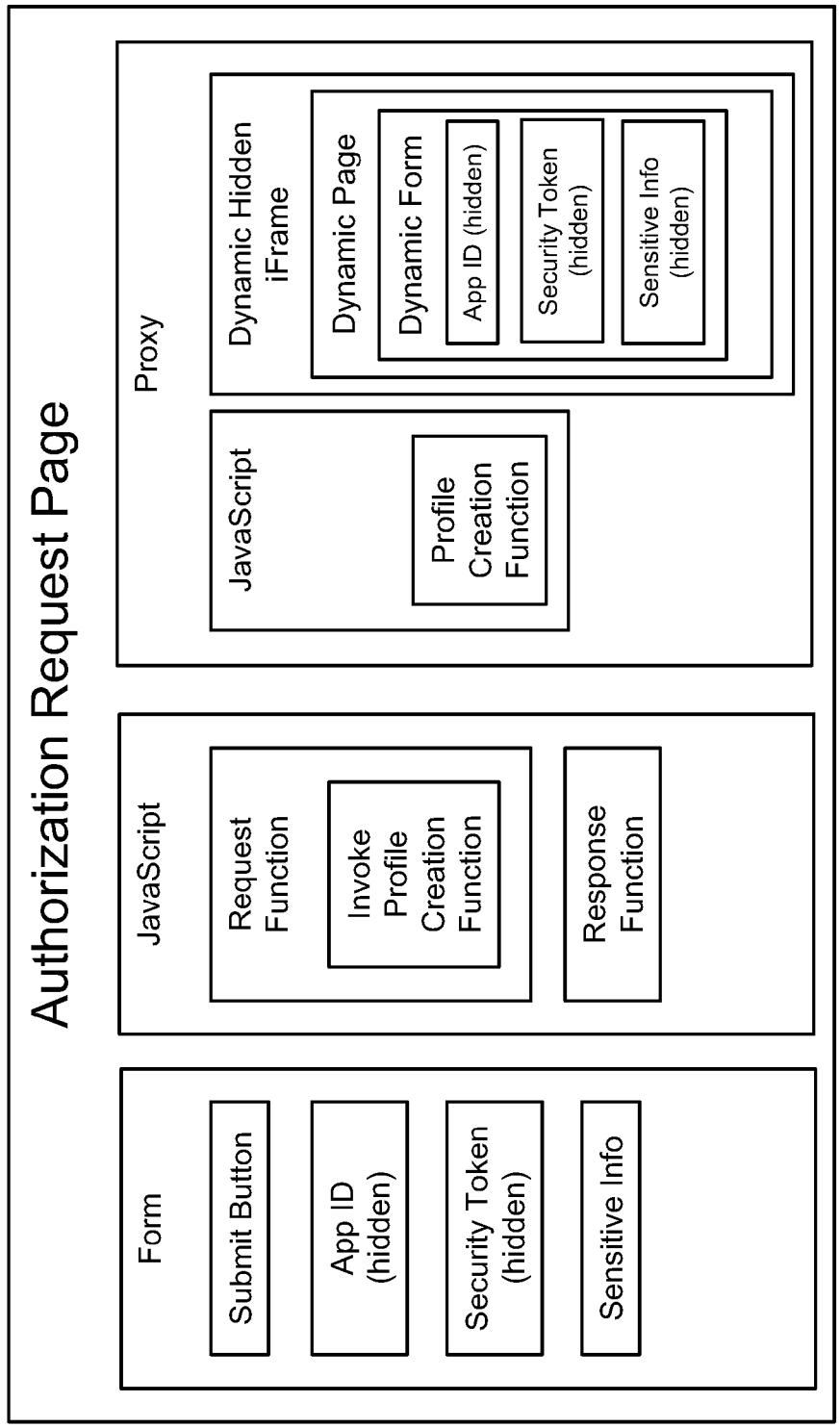

In step S209, the request function, illustrated at FIG. 3A, is invoked at the client 101. The request function includes executable code for triggering functionality to be executed within the authorization request page. For example, the invoke profile creation function, illustrated at FIG. 3A, may be executed, thus triggering the profile creation function. The profile creation function is executable code within the authorization request page, which when executed on the client 101, is operable to generate a dynamic hidden iframe at the client 101. The dynamic hidden iframe is illustrated at FIG. 3B. FIG. 3B illustrates the authorization request page as illustrated in FIG. 3A, except the dynamic hidden iframe has been generated. The hidden iframe includes a content document such as a dynamic page. The dynamic page includes a dynamic form including form elements. The profile creation function generates the dynamic page and sets form data within the dynamic page. For example, the profile creation function obtains the application ID, the security token, and the sensitive information described above and sets these values as inputs in the dynamic page. The dynamic iframe is not visible when the browser 106 displays the authorization request page. Accordingly, the application ID, the security token, and the sensitive information are hidden inputs, not displayed to the user via the browser 106, in the dynamic page.

In some embodiments, the server 103 provides the server 102 with the executable code comprising the profile creation function. The server 102 may receive the executable code comprising the profile creation function from the server 103 and then embed the profile creation function within the authorization request page component 107. Accordingly, the hidden iframe can be hosted by the server 102 as part of the authorization request page, the hidden iframe being generated at run time on the client side. The hidden iframe may be configured to communicate directly with the server 103 once it is generated. Moreover, the server 102 and the server 103 may be running applications on different domains. Accordingly, the iframe may enable cross-domain messaging in the manner described herein.

In step S210, the form information set in step S209 is sent from the client 101 to the server 103. For example, the sensitive information provided by the user at step S207 may be submitted, via the hidden iframe, to the server 103. The hidden iframe may communicate with the server 103 using HTTP. Additionally, the iframe may cause a secure connection to be established between the iframe and the server 103 using the secure socket layer (SSL) protocol. For example, a private encryption key may be used to encrypt data that is transferred over an SSL connection. By embedding the iframe directly within the authorization request page, the sensitive information is able to be submitted to the server 103 for purposes of completing the transaction with the merchant associated with the server 102, without requiring the server 102 to collect or process the sensitive information.

In step S211, the form information sent in step S210 is received at the server 103 via the HTML form interface 112. For example, the server 103 receives the application ID, the security token, and the sensitive information.

In step S212, in response to receiving the information in step S211, the transaction token acquisition module 115 is invoked at the server 103. The server 103 utilizes the security token verification module 116 to verify the security token received in step S211 and which was generated in step S204. To verify the security token, the security token verification module 116 verifies the digital signature, decrypts the security token, checks the time stamp and verifies the security token has not been used previously. To verify the digital signature of the message, the server 103 may use the server's 102 public key to decode the digital signature, in order to obtain what should be a matching digest for the received message. Then, the server 103 decrypts the message using the server's 103 private key. Once the security token is decrypted, the server 103 checks the time stamp and verifies the security token has not been used previously. If the time stamp specifies a time that is prior to a predetermined expiration time and if the security token has not previously been used, then the process continues to step S213. If the security token is not verified (for example, if the digital signature is not verified, decryption of the message fails, the time stamp is expired, or the security token has been used previously), then the server 103 notifies the client 101 via the iframe. By virtue of the verification process in step S212, the server 102 may be authenticated and the integrity of a one-time message may be maintained.

In step S213, the server 103 sends the sensitive information and a request to the service provider 104. The server 103 may communicate with the service provider 104 over an SSL connection. In step S213, the server 103 may request that the service provider 104 provide to the server 103 a transaction token. The transaction token may be an identifier comprising a string of characters that may be utilized to refer to the sensitive information sent with the request in step S213. The identifier may comprise a numeric or alpha numeric sequence of characters of an arbitrary length. By way of example, a credit card number could be referenced by a transaction token made up of a sequence of characters that is different from the credit card number. The transaction token may only have meaning to the service provider 104 for transactions processed by the service provider 104. In some embodiments, the transaction token may only be valid for a single transaction.

In step S214, the service provider 104 receives the sensitive information and the request sent in step S213. In step S215, in response to receiving the sensitive information and the request, the tokenization service 118 is invoked at the service provider 104. The service provider 104 generates the requested transaction token. Moreover, the service provider 104 may associate the sensitive information and the transaction token with each other and store the sensitive information and the transaction token in the database 119. In step S216, the service provider 104 sends the transaction token to the server 103.

In step S217, the server 103 receives the transaction token sent in step S216. In step S218, in response to receiving the transaction token, the transaction token acquisition module 115 is invoked at the server 103. The server 103 utilizes the transaction token encryption module 117 to encrypt the transaction token received in step S217. The server 103 encrypts the transaction token using the server's 102 public key, for example, with a public key encryption algorithm such as RSA. The same encryption technique used in step S204 is used in step S218 in some implementations. Once encrypted, the encrypted transaction token can be decrypted only using the server's 102 private key, according to embodiments. After encrypting the generated data, the server 103 signs the message using a digital signature. For example, the digital signature may be a digest of the message, for example, a hash of the message, encoded using the server's 103 private key, which can then be appended to the outgoing message. Later, to verify the digital signature of the message, the server 102 may use the same technique as the server 103, for example, using the same standard hash algorithm, to obtain a digest of the message that the server 102 has received. For example, the server 102 may use the server's 103 public key to decode the digital signature, in order to obtain what should be a matching digest for the received message. Accordingly, by verifying a digital signature in this way, authentication of the server 103 and message integrity can be maintained.

In step S219, after the transaction token encryption module 117 has executed the above-described encryption process on the transaction token, the server 103 outputs the encrypted transaction token via the HTML form interface 112. In step S219, the server 103 may send a call back URL to the iframe, the call back URL specifying a web page hosted by the server 102 and including the transaction token as a parameter. In step S220, the call back URL is received at the client 101 from the server 103. In some embodiments, the call back URL specifies a proxy page hosted at the server 102. In step S221, a request to access the web page identified by the call back URL is sent from the client 101 to the server 102. In some embodiments, the request sent in step S221 is a request for the proxy page illustrated at FIG. 3C.

At step S222, the server 102 receives the request sent in step S221. At step S223, in response to receiving the request, the proxy page component 109 is invoked at the server 102. The server 102 prepares the proxy page to send to the client 101. The server 102 then sends the proxy page and the encrypted transaction token to the client 101.

Figure 3C:
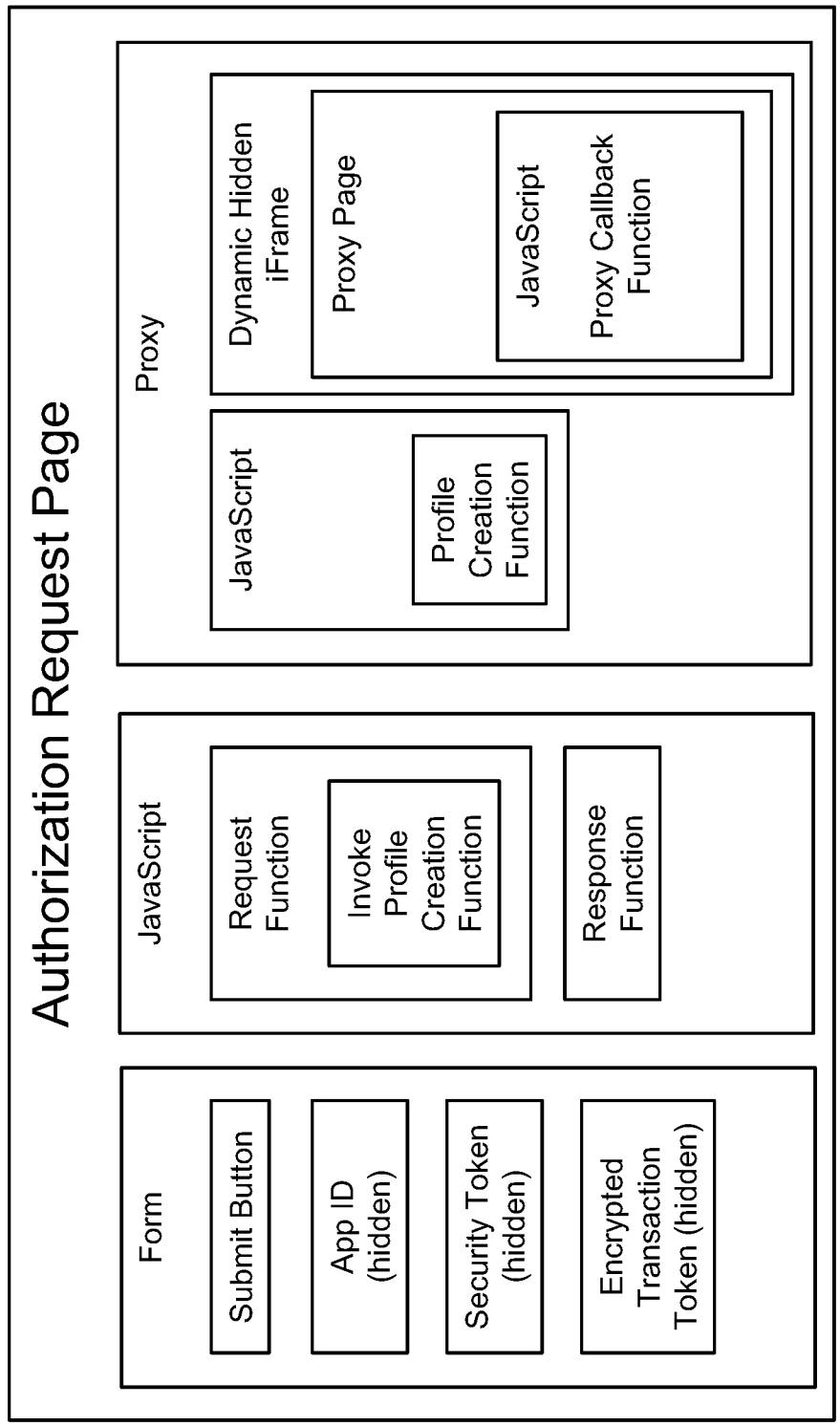

In step S224, the client 101 receives the proxy page and the encrypted transaction token sent in step S223. The proxy page may be a page in the hidden iframe. In some embodiments, the proxy page is the proxy page illustrated in FIG. 3C. FIG. 3C illustrates the authorization request page as illustrated in FIG. 3B, except the dynamic page in the hidden iframe has been replaced by the proxy page received in step S224. Additionally, in FIG. 3C relative to FIG. 3B, the encrypted transaction token is set as an input and the sensitive information is removed as an input in the form data of the authorization request page, as described with respect to step S225.

In step S225, the response function, illustrated at FIGS. 3A-3C, is invoked at the client 101. The response function includes executable code within the authorization request page, which when executed on the client 101, is operable to perform operations with respect to the form data of the authorization request page. For example, the response function may clear the sensitive information received in step S207 and set the encrypted transaction token received in step S224 as an entry in the form data of the authorization request page. The encrypted transaction token may be a hidden input, not displayed to the user via the browser 106, in the authorization request page. In step S226, the encrypted transaction token is sent from the client 101 to the server 102.

In step S227, the server 102 receives the encrypted transaction token sent in step S226. In step S228, in response to receiving the encrypted transaction token, the transaction token decryption module 111 is invoked at the server 102. In step S228, the server 102 verifies the digital signature applied by the server 103 in step S218. Additionally, the server 102 decrypts the transaction token that was encrypted by the server 103 in step S218. To verify the digital signature of the message, the server 102 may use the server's 103 public key to decode the digital signature, in order to obtain what should be a matching digest for the received message. Then, the server 102 decrypts the message using the server's 102 private key. If the transaction token is not verified (for example, if the digital signature is not verified or the decryption of the message fails), then the server 102 notifies the client 101. If the transaction token is verified, the process continues to step S229. In step S229, the server 102 sends the transaction token and a request to the service provider 104. The request may be a request to authorize a transaction based on the transaction token. In connection with the transaction token and the request, the server 102 may provide additional information, such as information related to the transaction, to the service provider 104.

In step S230, the service provider 104 receives the transaction token and the request sent in step S229. In step S231, in response to receiving the transaction token and the request, the authorization service 120 is invoked at the service provider 104. The service provider 104 may refer to information stored in the database 119 in order to provide the requested authorization services. In step S232, the service provider 104 sends to the server 102 a response to the request received at step S230. The service provider 104 may respond indicating success or failure regarding the transaction, for example.

In step S233, the server 102 receives the authorization response sent in step S232. In step S234, in response to receiving the authorization response, the authorization result page component 110 is invoked at the server 102. The server 102 prepares the authorization result page to send to the client 101. The server 102 then sends the authorization result page to the client 101. Depending upon the response from the service provider 104, the authorization result page will be a corresponding indication of authorization success or authorization failure.

In step S235, the client 101 receives the authorization result page sent in step S234. The browser 106 interprets and processes the authorization result page. Once the authorization request page is loaded, information is displayed via the browser 106. For example, depending upon the response from the service provider 104, a corresponding authorization success page or authorization failure page may be displayed via the browser 106. FIG. 3D illustrates the authorization result page.

In some embodiments, various steps described above are performed over a period of time without requiring a user input operation for the duration of the period. For example, referring to FIG. 2, in some embodiments, steps S202 to S206 are performed by one or more of the client 101, the server 102, the server 103, and the service provider 104 over a period of time without requiring a user input operation for the duration of the period. Further by way of example, in some embodiments, steps S208 to S235 are performed by one or more of the client 101, the server 102, the server 103, and the service provider 104 over a period of time without requiring a user input operation for the duration of the period.

Figure 4:
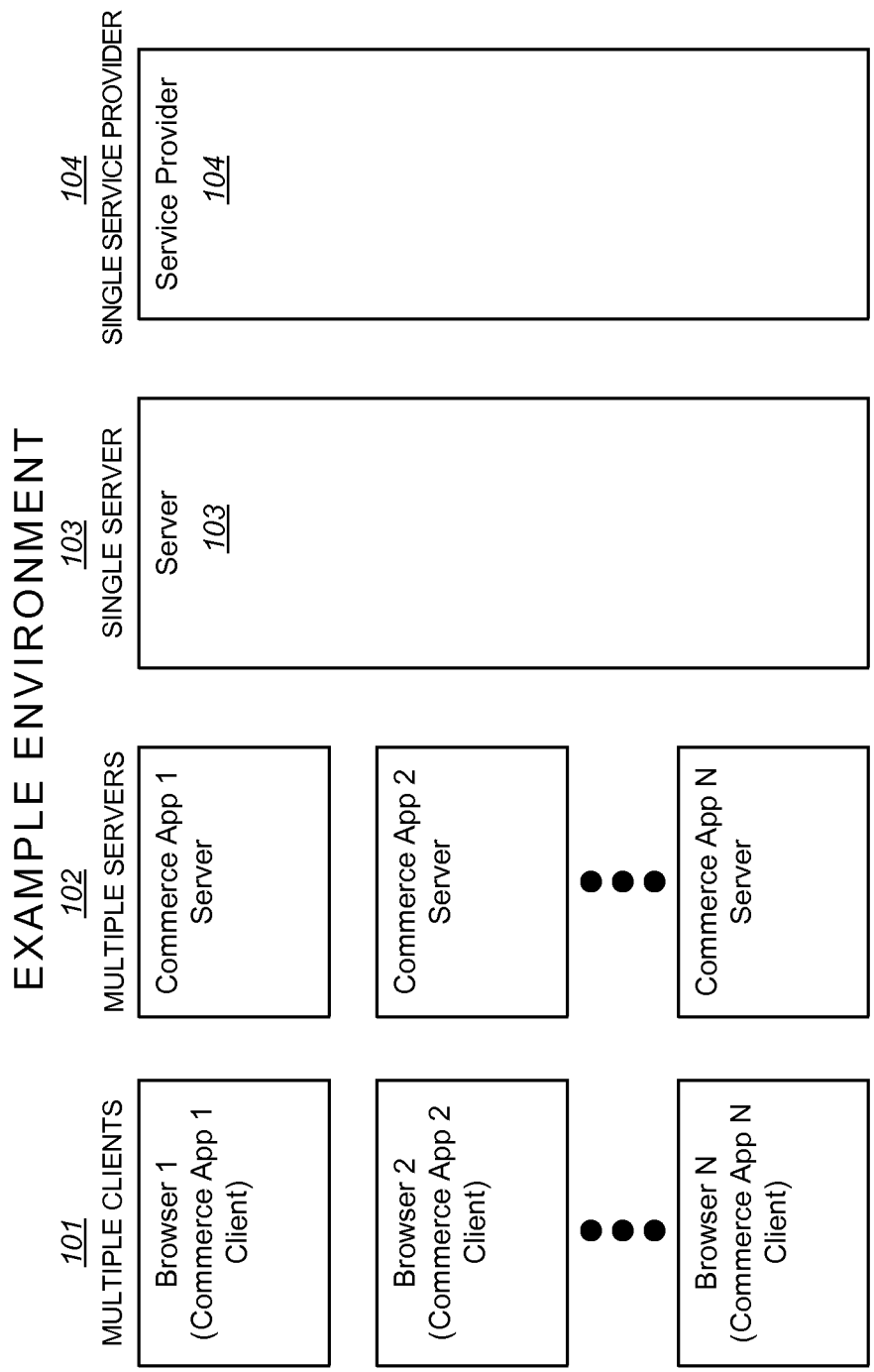
FIG. 4 illustrates an example environment in which embodiments of the present invention may operate.

FIG. 4 illustrates an example environment in which embodiments of the present invention may operate. In the example environment of FIG. 4, multiple browsers running on respective clients may access multiple commerce applications running on respective servers. The multiple browsers depicted in FIG. 4 may each be a browser such as the browser 106 of FIG. 1; and the respective clients depicted in FIG. 4 on which the browsers are running may each be a client such as the client 101 of FIG. 1. Moreover, the multiple servers hosting respective commerce applications as depicted in FIG. 4 may each be a server such as the server 102 of FIG. 1. FIG. 4 illustrates that multiple commerce applications, such as an application associated with a merchant, may utilize a single server 103 and a single service provider 104 to carry out and process transactions. Accordingly, the various components of the system depicted in FIG. 1 and described herein enable centralized, aggregated transaction processing.

In the realm of electronic commerce, for example, such a system may be particularly advantageous. By centralizing and aggregating payment processing in a manner that maintains the unique shopping experience of each electronic commerce system, the disclosed system reduces the number of entities that must adhere to audit compliance implementation guidelines. This reduction of scope may reduce the overall cost of audits and maintenance of adhering to the compliance implementation guidelines while not impacting the usability, user experience or function of each unique electronic commerce system.

Figure 5:
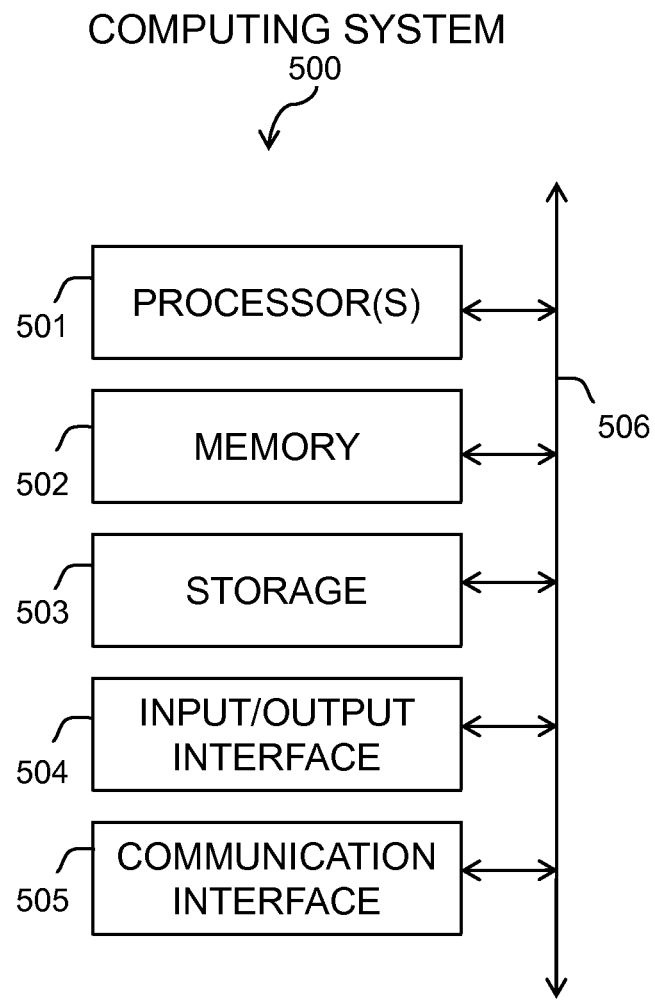
FIG. 5 illustrates an example computing system.

FIG. 5 illustrates an example computing system 500. According to various embodiments, all or a portion of the description of the computing system 500 is applicable to all or a portion of one or more of the client 101, the server 102, the server 103, and the service provider 104.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

In some embodiments, the computing system 500 performs one or more steps of one or more methods described or illustrated herein. In some embodiments, the computing system 500 provides functionality described or illustrated herein. In some embodiments, software running on the computing system 500 performs one or more steps of one or more methods described or illustrated herein or provides functionality described or illustrated herein. Some embodiments include one or more portions of the computing system 500.

The computing system 500 includes one or more processor(s) 501, memory 502, storage 503, an input/output (I/O) interface 504, a communication interface 505, and a bus 506. The computing system 500 may take any suitable physical form. For example, and not by way of limitation, the computing system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The processor(s) 501 include hardware for executing instructions, such as those making up a computer program. The processor(s) 501 may retrieve the instructions from the memory 502, the storage 503, an internal register, or an internal cache. The processor(s) 501 then decode and execute the instructions. Then, the processor(s) 501 write one or more results to the memory 502, the storage 503, the internal register, or the internal cache. The processor(s) 501 may provide the processing capability to execute the operating system, programs, user and application interfaces, and any other functions of the computing system 500.

The processor(s) 501 may include a central processing unit (CPU), one or more general-purpose microprocessor(s), application-specific microprocessor(s), and/or special purpose microprocessor(s), or some combination of such processing components. The processor(s) 501 may include one or more graphics processors, video processors, audio processors and/or related chip sets.

In some embodiments, the memory 502 includes main memory for storing instructions for the processor(s) 501 to execute or data for the processor(s) 501 to operate on. By way of example, the computing system 500 may load instructions from the storage 503 or another source to the memory 502. During or after execution of the instructions, the processor(s) 501 may write one or more results (which may be intermediate or final results) to the memory 502. One or more memory buses (which may each include an address bus and a data bus) may couple the processor(s) 501 to the memory 502. One or more memory management units (MMUs) may reside between the processor(s) 501 and the memory 502 and facilitate accesses to the memory 502 requested by the processor(s)

501. The memory 502 may include one or more memories. The memory 502 may be random access memory (RAM).

The storage 503 stores data and/or instructions. As an example and not by way of limitation, the storage 503 may include a hard disk drive, a floppy disk drive, flash memory, an optical disc, a magneto-optical disc, magnetic tape, or a Universal Serial Bus (USB) drive or a combination of two or more of these. In some embodiments, the storage 503 is a removable medium. In some embodiments, the storage 503 is a fixed medium. In some embodiments, the storage 503 is internal to the computing system 500. In some embodiments, the storage 503 is external to the computing system 500. In some embodiments, the storage 503 is non-volatile, solid-state memory. In some embodiments, the storage 503 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 503 may include one or more memory devices. One or more program modules stored in the storage 503 may be configured to cause various operations and processes described herein to be executed.

The I/O interface 504 includes hardware, software, or both providing one or more interfaces for communication between the computing system 500 and one or more I/O devices. The computing system 500 may include one or more of these I/O devices, where appropriate. One or more of these I/O devices may enable communication between a person and the computing system 500. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 504 includes one or more device or software drivers enabling the processor(s) 501 to drive one or more of these I/O devices. The I/O interface 504 may include one or more I/O interfaces.

The communication interface 505 includes hardware, software, or both providing one or more interfaces for communication (such as, for example, packet-based communication) between the computing system 500 and one or more other computing systems or one or more networks. As an example and not by way of limitation, the communication interface 505 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 505 for it. As an example and not by way of limitation, the computing system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 500 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 500 may include any suitable communication interface 505 for any of these networks, where appropriate. The communication interface 505 may include one or more communication interfaces 505.

The bus 506 interconnects various components of the computing system 500 thereby enabling the transmission of data and execution of various processes. The bus 506 may include one or more types of bus structures including a memory bus or memory controller, a peripheral bus, and a local bus using any of a variety of bus architectures.

Various above-described operations performed by the client 101, the server 102, the server 103, and the service provider 104 may be executed and/or controlled by one or more applications running on the client 101, the server 102, the server 103, and the service provider 104, respectively. The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a computer-readable storage medium storing instructions which, when executed by one or more processors, cause the one or more processors to perform one or more embodiments of the invention described herein. The scope of the present invention includes a computer-readable storage medium storing instructions which, when executed by one or more processors, cause the one or more processors to perform one or more embodiments of the invention described herein.

Examples of a computer-readable storage medium include a floppy disk, a hard disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

What is claimed is:

1. A method comprising:

receiving, at a first server from a browser on a client, a security token and sensitive information, the security token having been generated by a second server, the second server having embedded the security token in a web page, the web page including embedded executable code configured to run within the browser on the client, wherein the embedded executable code, when executed on the client, is operable to cause the browser to send the sensitive information and the security token to the first server without requiring the sensitive information be sent to the second server, wherein the sensitive information comprises sensitive information the browser sent to the first server via an inline frame, and wherein the sensitive information is required to complete a transaction;

at the first server, performing operations on the security token for authenticating the second server and determining whether the security token is expired;

in response to authenticating the second server and determining that the security token is not expired, sending, from the first server to a service provider, the sensitive information and a request for a transaction token;

receiving, at the first server from the service provider, the transaction token, the transaction token comprising a string of characters associated with the sensitive information;

at the first server, using a public key of the second server to encrypt the transaction token; and sending, from the first server to the client, a uniform resource locator (URL) specifying a page hosted by the second server, the URL including the encrypted transaction token as a parameter, wherein the URL is configured to cause the browser on the client to send, to the second server, a request for the page and the encrypted transaction token.

2. The method of claim 1, further comprising:
sending, from the first server to the second server, executable code configured to run within the browser on the client, wherein the executable code, when executed on the client, is operable to cause the browser to send the security token and the sensitive information to the first server.

3. The method of claim 1, further comprising:
sending, from the first server to the second server, executable code configured to run within the browser on the client, wherein the executable code, when executed on the client, is operable to generate the inline frame that is configured to communicate with the first server.

4. The method of claim 3, wherein the inline frame is configured to cause a secure connection to be established between the inline frame and the first server.

5. The method of claim 1, wherein the first server is running an application on a first domain, and
wherein the second server is running an application on a second domain different from the first domain.

6. The method of claim 1, wherein the performing operations on the security token for authenticating the second server and determining whether the security token is expired comprises:
using the public key of the second server to decode a digital signature;
using a private key of the first server to decrypt the security token; and
checking information for determining whether the security token is expired.

7. The method of claim 1, further comprising:
receiving, at the first server from a browser on a second client, a second security token and second sensitive information, the second security token having been generated by a third server different from the second server;
at the first server, performing operations on the second security token for authenticating the third server and determining whether the second security token is expired;
in response to authenticating the third server and determining that the second security token is not expired, sending, from the first server to the service provider, the second sensitive information and a request for a second transaction token;
receiving, at the first server from the service provider, the second transaction token, the second transaction token comprising a string of characters associated with the second sensitive information;
at the first server, using a public key of the third server to encrypt the second transaction token; and
sending, from the first server to the second client, a second URL specifying a page hosted by the third server, the second URL including the encrypted second transaction token as a parameter, wherein the second URL is configured to cause the browser on the second client to send, to the third server, a request for the page hosted by the third server and the encrypted second transaction token.

8. A system comprising:
one or more hardware processors; and
one or more non-transitory computer-readable media coupled to the one or more hardware processors, the one or more non-transitory computer-readable media storing instructions that, when executed by the one or more hardware processors, cause the one or more hardware processors to perform operations comprising:
receiving, at a first server from a browser on a client, a security token and sensitive information, the security token having been generated by a second server, the second server having embedded the security token in a web page, the web page including embedded executable code configured to run within the browser on the client, wherein the embedded executable code, when executed on the client, is operable to cause the browser to send the sensitive information and the security token to the first server without requiring the sensitive information be sent to the second server, wherein the sensitive information comprises sensitive information the browser sent to the first server via an inline frame, and wherein the sensitive information is required to complete a transaction;
at the first server, performing operations on the security token for authenticating the second server and determining whether the security token is expired;
in response to authenticating the second server and determining that the security token is not expired, sending, from the first server to a service provider, the sensitive information and a request for a transaction token;
receiving, at the first server from the service provider, the transaction token, the transaction token comprising a string of characters associated with the sensitive information;
at the first server, using a public key of the second server to encrypt the transaction token; and
sending, from the first server to the client, a uniform resource locator (URL) specifying a page hosted by the second server, the URL including the encrypted transaction token as a parameter, wherein the URL is configured to cause the browser on the client to send, to the second server, a request for the page and the encrypted transaction token.

9. The system of claim 8, the instructions comprising instructions that, when executed by the one or more hardware processors, cause the one or more hardware processors to perform operations further comprising:
sending, from the first server to the second server, executable code configured to run within the browser on the client, wherein the executable code, when executed on the client, is operable to cause the browser to send the security token and the sensitive information to the first server.

10. The system of claim 8, the instructions comprising instructions that, when executed by the one or more hardware processors, cause the one or more hardware processors to perform operations further comprising:
sending, from the first server to the second server, executable code configured to run within the browser on the client, wherein the executable code, when executed on the client, is operable to generate the inline frame that is configured to communicate with the first server.

11. The system of claim 10, wherein the inline frame is configured to cause a secure connection to be established between the inline frame and the first server.

12. The system of claim 8, wherein the first server is running an application on a first domain, and
wherein the second server is running an application on a second domain different from the first domain.

13. The system of claim 8, wherein the performing operations on the security token for authenticating the second server and determining whether the security token is expired comprises:
using the public key of the second server to decode a digital signature;
using a private key of the first server to decrypt the security token; and
checking information for determining whether the security token is expired.

14. The system of claim 8, the instructions comprising instructions that, when executed by the one or more hardware processors, cause the one or more hardware processors to perform operations further comprising:
receiving, at the first server from a browser on a second client, a second security token and second sensitive information, the second security token having been generated by a third server different from the second server;
at the first server, performing operations on the second security token for authenticating the third server and determining whether the second security token is expired;
in response to authenticating the third server and determining that the second security token is not expired, sending, from the first server to the service provider, the second sensitive information and a request for a second transaction token;
receiving, at the first server from the service provider, the second transaction token, the second transaction token comprising a string of characters associated with the second sensitive information;
at the first server, using a public key of the third server to encrypt the second transaction token; and
sending, from the first server to the second client, a second URL specifying a page hosted by the third server, the second URL including the encrypted second transaction token as a parameter, wherein the second URL is configured to cause the browser on the second client to send, to the third server, a request for the page hosted by the third server and the encrypted second transaction token.

15. A non-transitory computer-readable medium storing instructions that, when executed by one or more hardware processors, cause the one or more hardware processors to perform operations comprising:
receiving, at a first server from a browser on a client, a security token and sensitive information, the security token having been generated by a second server, the second server having embedded the security token in a web page, the web page including embedded executable code configured to run within the browser on the client, wherein the embedded executable code, when executed on the client, is operable to cause the browser to send the sensitive information and the security token to the first server without requiring the sensitive information be sent to the second server, wherein the sensitive information comprises sensitive information the browser sent to the first server via an inline frame, and wherein the sensitive information is required to complete a transaction;
at the first server, performing operations on the security token for authenticating the second server and determining whether the security token is expired;
in response to authenticating the second server and determining that the security token is not expired, sending, from the first server to a service provider, the sensitive information and a request for a transaction token;
receiving, at the first server from the service provider, the transaction token, the transaction token comprising a string of characters associated with the sensitive information;
at the first server, using a public key of the second server to encrypt the transaction token; and
sending, from the first server to the client, a uniform resource locator (URL) specifying a page hosted by the second server, the URL including the encrypted transaction token as a parameter, wherein the URL is configured to cause the browser on the client to send, to the second server, a request for the page and the encrypted transaction token.

16. The non-transitory computer-readable medium of claim 15, the instructions comprising instructions that, when executed by the one or more hardware processors, cause the one or more hardware processors to perform operations further comprising:
sending, from the first server to the second server, executable code configured to run within the browser on the client, wherein the executable code, when executed on the client, is operable to cause the browser to send the security token and the sensitive information to the first server.

17. The non-transitory computer-readable medium of claim 15, the instructions comprising instructions that, when executed by the one or more hardware processors, cause the one or more hardware processors to perform operations further comprising:
sending, from the first server to the second server, executable code configured to run within the browser on the client, wherein the executable code, when executed on the client, is operable to generate the inline frame that is configured to communicate with the first server.

18. The non-transitory computer-readable medium of claim 17, wherein the inline frame is configured to cause a secure connection to be established between the inline frame and the first server.

19. The non-transitory computer-readable medium of claim 15, wherein the first server is running an application on a first domain, and
wherein the second server is running an application on a second domain different from the first domain.

20. The non-transitory computer-readable medium of claim 15, wherein the performing operations on the security token for authenticating the second server and determining whether the security token is expired comprises:
using the public key of the second server to decode a digital signature;
using a private key of the first server to decrypt the security token; and
checking information for determining whether the security token is expired.

* * * * *